FREDERICK R. MUCCINO
INVENTOR.

BY

Claude Funkhouser
ATTORNEY

United States Patent Office 3,355,569
Patented Nov. 28, 1967

3,355,569
PRESSURE STABILIZED WELDING APPARATUS
Frederick R. Muccino, Clarksville, Md., assignor to the United States of America as represented by the Secretary of the Navy
Filed May 8, 1964, Ser. No. 366,208
6 Claims. (Cl. 219—86)

This invention relates generally to welding, and more particularly to an improved pressure stabilized welder for achieving consistently reliable welds.

The welding of electronic components into circuit configurations has recently been undertaken to increase the reliability of such configurations, and ultimately to increase the reliability of the system into which the circuit configurations are integrated.

Welded component connections are preferred to soldered connections because the components are not subjected to the life-reducing damage that can result from the high temperatures necessary in soldering. Also, the component leads are never bent, thus eliminating the damage that often accompanies bending. Additionally, welded connections are inherently more reliable than soldered connections, since the characteristics of a weld are determined principally by the welding machine and not by operator judgment, as in the case of soldering.

In order to obtain a consistently reliable weld, it is necessary to adjust each welding machine for welding variables, including the material constituting the leads of the components, the type and material of the electrodes, and the type of weld desired. Additionally, once the welding variables have been determined, the amount of pressure on the welding electrodes and the duration of the welding pulse may be varied.

One object of the present invention, therefore, resides in providing a welder which consistently produces high quality welds.

Another object of the invention is to provide a welder which can be used with all welding materials.

A further object of the invention is to provide a welder which is less sensitive to the usual welding variables.

Other objects and many of the attendant advantages of this invention will be readily appreciated as the same becomes better understood by reference to the following detailed description when considered in connection with the accompanying drawings, wherein.

Briefly, the invention is an improvement for a standard welding machine. During the welding of electronic components, the welding machine's electrodes hold the components under pressure. When the welding pulse or current is applied to the components it peaks in a sinusoidal fashion and, after reaching maximum, decays to zero. In a poor weld this decay may appear as an irregular waveform with many abrupt spikes and valleys. It is this irregular decay of the welding current that connotes a weld having pits or voids and being otherwise unsuitable. The irregular decay, during the last half of the welding cycle, is not produced when welding materials of high resistivity such as nickel, nickel alloys, or steel are used. When a material with a low resistivity such as copper, silver, gold, or platinum is welded, the irregular decay pattern is present and the welding of these materials presents a difficult problem.

This problem may be solved by increasing the rate at which the weld current decays after reaching its maximum peak. To accomplish this a secondary force is applied to the welding electrodes. After this force reaches maximum the welding current is applied. The two elements, secondary force and weld current, are applied in such a manner that the force is decreasing in value just prior to the peak of the welding current. As the secondary force drops off it allows the pressure between the welded parts and the welding electrodes to decrease, thus increasing the resistance through the interfaces of these pieces. With increased resistance the amount of current which will pass through the weld is decreased. Or, to state it in other words, the current is decreased at a greater than normal rate, due to increasing resistance, and thereby the current decay is not subject to the irregularities encountered under normal conditions.

Figure 1:
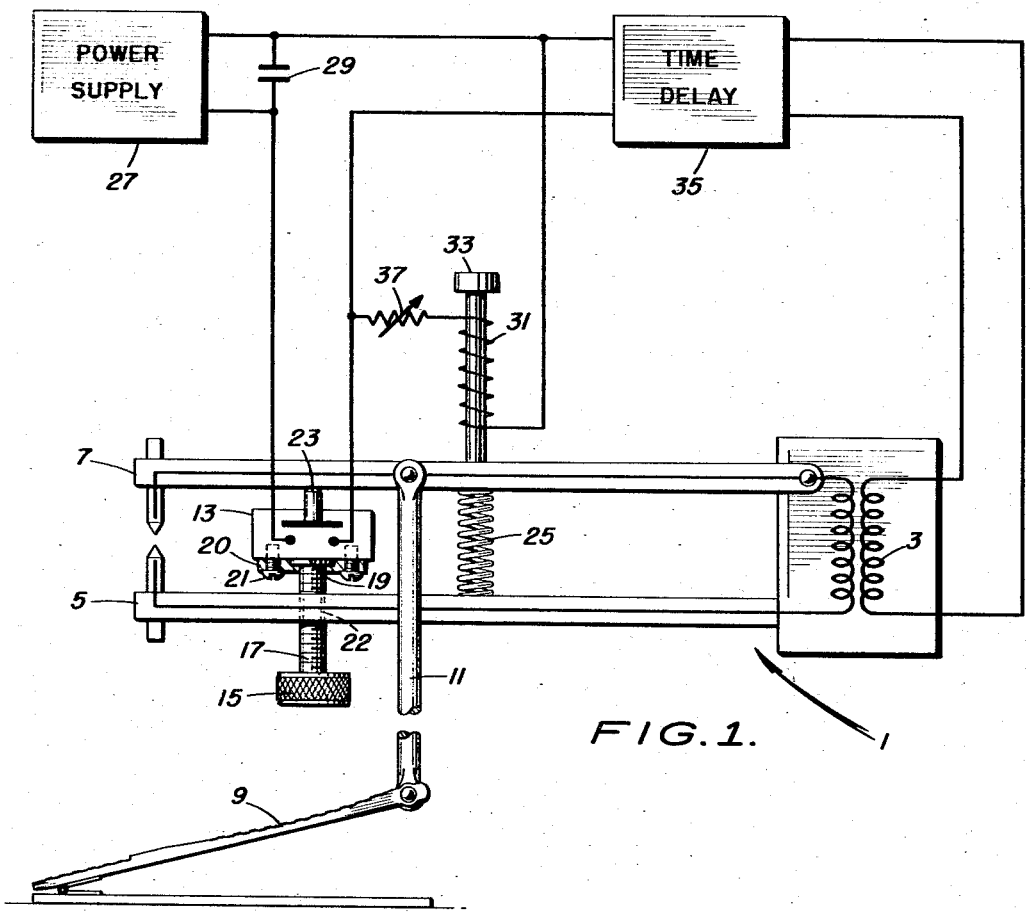
FIG. 1 is a schematic diagram of one embodiment of the invention.

Referring to the drawings, FIG. 1 shows a welding head 1, having a stepdown power transformer 3. The secondary winding of the power transformer is attached to a fixed electrode 5 and also to a movable electrode 7. These electrodes, 5 and 7, are brought together by conventional mechanical means, such as a foot treadle 9. The foot treadle 9 is linked to the movable electrode 7 by a linkage arm 11. The pressure or force exerted by the electrodes 5 and 7, on the work pieces to be welded by these electrodes, may be adjusted by varying the point at which a switch 13 closes. That is, the foot treadle, or similar means, increases the pressure upon the electrodes until, at a predetermined pressure, switch 13 closes and initiates the weld pulse. The adjustment of switch 13 may be achieved by an adjustable knob 15 which is attached to a threaded rod 17. This rod terminates in a flange 19 which is rotatably mounted in a plate 20 attached, as by screws 21, to the switch 13. The threaded rod 17 passes through an internally threaded hole 22 in the electrode 5. Contact between the switch 13 and the electrode 7 is achieved through an arm 23. A compression spring 25 is provided between the electrodes 5 and 7 to continually urge them towards separation.

A power supply 27, capable of supplying direct current, charges a capacitor 29. This power supply is similar in circuitry to those well-known in the art. When the predetermined pressure, against the pieces to be welded, is reached, the switch 13 is closed and electrical energy from the power supply 27 energizes the capacitor 29 which discharges through the coil of a solenoid 31. The plunger 33 of the solenoid 31 is then forced against the electrode 7, creating a secondary pulsed force thereon and momentarily increasing the pressure between the electrodes. The electrical energy from the power supply 27 and the capacitor 29 is not immediately applied to the primary winding of the power transformer 3, but rather it is delayed by a delay circuit 35.

The delay circuit 35 may comprise a resistor-capacitor circuit such as those well-known in the art and can be adjustable to vary the time delay from 10 to 50 milliseconds. This adjustment may be achieved in a well-known manner as by varying the resistance of said delay circuit. The range of possible delays will allow for compensations required by welding leads having minute differences in mass. Additionally, this range of possible delays will allow precise settings for different welding materials. To further increase the adjustability of the welder a variable resistance 37 is connected in series with the coil of the solenoid 31. This resistance allows the secondary pulsed force, applied by the solenoid, to be varied in accordance with the material used.

Figure 2:
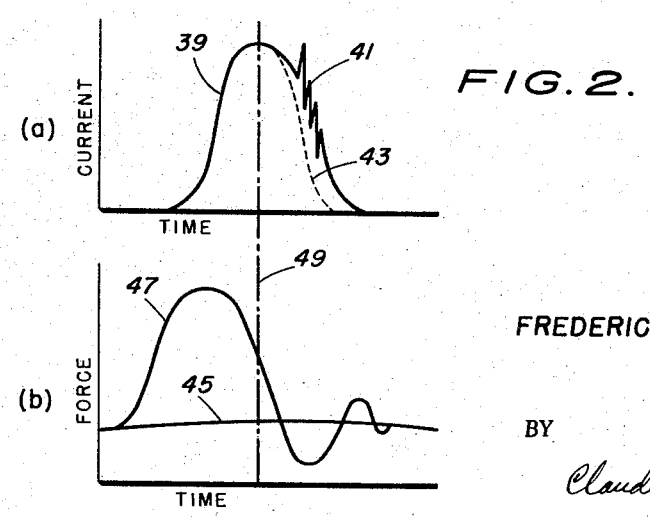
FIG. 2 is a waveform diagram useful in explaining the operation of the invention.

In FIG. 2, graph (a), the curve 39 represents the current in a welding pulse formed by the discharging capacitor 29. The irregular decay portion 41 of the curve 39 is typical of a decaying weld pulse when the welded material, such as copper, silver, gold, or platinum, has a low resistivity. If the decay could be induced to follow a curve having a shape as indicated at 43, thereby eliminating the irregular spikes and valleys of the decay curve 41, the quality of the weld would be improved.

Curve 45 of FIG. 2, graph (b), represents the initial force applied to the welding pieces by the treadle 9. The force applied by the plunger 33 of the solenoid 31 is represented by curve 47. The sudden application of the secondary force applied by the plunger 33 relieves the tension on the linkage arm 11 so that, during the duration in microseconds of the secondary force pulse, the reaction force of the treadle 9 against the foot of the operator is suddenly lessened. Thus, foot treadle pressure cannot increase substantially during the duration of the force applied by the plunger 33. The broken line 49 indicates the point at which a weld takes place. Any heat applied to the weld after this point is reached will be detrimental to that weld. To prevent this it is desirable to end the weld as quickly as possible after the weld point has been reached. The application of the secondary pulsed force just prior to and during the weld point achieves this result. As the secondary force drops off along the curve 47, the pressure between the interfaces of the welded pieces and the welding electrodes decreases. This decreasing pressure increases the resistance, thereby decreasing the current flow. The result is a current decay similar to that of curve 43, thus eliminating the irregular decay and thereby producing a reliable weld.

Obviously, many modifications and variations of the present invention, such as rearranging components, modification of geometry, and the like, will become evident to persons skilled in the art, in the light of the above teachings. It is to be understood, therefore, that within the scope of the appended claims, the invention may be practiced otherwise than as specifically described.

What is claimed is:

1. A pressure stabilized welder adapted to weld material of low resistivity, comprising,
   a welding head,
   a pair of welding electrodes operatively connected to said welding head,
   means for applying an initial force to said electrodes,
   means by which a secondary pulsed force may be applied to said electrodes,
   means responsive to the application of said initial force for energizing said secondary force,
   means for applying a welding pulse, and
   means for delaying said welding pulse so that its maximum current is reached during the decay of said secondary pulsed force.

2. A welder as recited in claim 1, wherein the means which delays said weld pulse may be adjusted to vary the time of application of said pulse.

3. A welder as recited in claim 1, wherein the means which applies said secondary pulsed force may be varied to control the amplitude of said secondary force acting upon said electrodes.

4. In a welder comprising a source of direct current, a capacitor connected to said source of current, a welding head having a pair of electrodes, means closing and applying initial pressure between said electrodes, and a power transformer having its primary winding connected to said capacitor and its secondary winding connected to said pair of electrodes, the improvement including,
   means for applying a secondary pulsed force to said welding electrodes,
   means responsive to the pressure between said electrodes for energizing said secondary force applying means,
   means for initiating a welding pulse, and
   means for delaying said welding pulse whereby the welding current reaches its maximum value after said secondary pulsed force has reached its peak value.

5. A welder as recited in claim 4, wherein the means for applying the secondary pulsed force upon said electrodes may be varied to control the amplitude of said force.

6. A welder as recited in claim 4, wherein said last mentioned means is variable for adjusting the delay of said weld pulse with respect to the peak value of said secondary pulsed force.

References Cited

UNITED STATES PATENTS

| 2,113,664 | 4/1938 | Simmie | 219—108 |
| 2,401,528 | 6/1946 | Vang | 219—86 |
| 2,473,772 | 6/1949 | Vang | 219—86 |

FOREIGN PATENTS 786,802   6/1935   France.

RICHARD M. WOOD, *Primary Examiner.*

JOSEPH V. TRUHE, *Examiner.*

W. D. BROOKS, *Assistant Examiner.*